United States Patent [19]
Shah

[11] 3,929,732
[45] Dec. 30, 1975

[54] LOW TEMPERATURE RESISTANT POLYURETHANE ELASTOMERS

[75] Inventor: Tilak M. Shah, North Haven, Conn.

[73] Assignee: The Upjohn Company, Kalamazoo, Mich.

[22] Filed: Sept. 16, 1974

[21] Appl. No.: 506,310

[52] U.S. Cl.... 260/77.5 AN; 260/22 D; 260/75 NB; 260/75 NP
[51] Int. Cl.² ......................................... C08G 18/66
[58] Field of Search....... 260/75 NP, 77.5 AN, 22 D

[56] References Cited
UNITED STATES PATENTS

| | | | |
|---|---|---|---|
| 2,753,319 | 7/1956 | Brockway | 260/75 NP |
| 2,871,218 | 1/1959 | Schollenberger | 260/75 NP |
| 3,341,498 | 9/1967 | Skreckoski et al. | 260/75 NK |
| 3,711,440 | 1/1973 | Chadwick | 260/75 NP |
| 3,823,060 | 7/1974 | McClung et al. | 260/75 NP |

*Primary Examiner*—H. S. Cockeram
*Attorney, Agent, or Firm*—Denis A. Firth; John Kekich

[57] ABSTRACT

Thermoplastic polyurethane elastomers having enhanced resistance to exposure to low temperatures are derived by reaction of 4,4'-methylenebis(phenyl isocyanate), a poly(1,4-butylene azelate) of molecular weight from 2300 to 3500, and an extender [aliphatic diol or bis(2-hydroxyethylether) of hydroquinone]. The elastomers are especially useful in fabricating parts for automobiles and the like which are exposed to temperatures fluctuating within the range of as low as −20°F to as high as 250°F.

7 Claims, No Drawings

LOW TEMPERATURE RESISTANT POLYURETHANE ELASTOMERS

BACKGROUND OF THE INVENTION

1. Field of the Invention

This invention relates to polyurethane elastomers and methods for their preparation and is more particularly directed to certain polyurethane elastomers derived from 4,4'-methylenebis(phenyl isocyanate) and a polyazelate.

2. Description of the Prior Art

Polyurethane elastomers derived from 4,4'-methylenebis(phenyl isocyanate) and a wide variety of polyester diols are well-known in the art. Polyester polyols derived from azelaic acid have been used in the preparation of such elastomers; see, for example, Boylan, Modern Plastics, May, 1967, p. 143. In general it has been recognized previously that the structural strength properties of such elastomers will increase as the molecular weight of the polyol increases but that this also leads to permanent crystallization of the polymer. Polymers which crystallize in this way are characterized by a glassy, boardy appearance and behaviour, have poor molding properties, and show low resistance to deformation at low temperatures.

We have now found, surprisingly, that a particular group of polyester polyols of relatively high molecular weight can be used, in proportions not commonly employed in the art, to yield elastomers which do not exhibit ready crystallization, have excellent physical properties and which maintain these properties on exposure to lower temperatures than those to which closely related polyurethane elastomers can be subjected without pronounced loss of desirable physical properties.

SUMMARY OF THE INVENTION

The invention comprises a thermoplastic polyurethane elastomer characterized by the presence therein of each of the recurring units having the formulae:

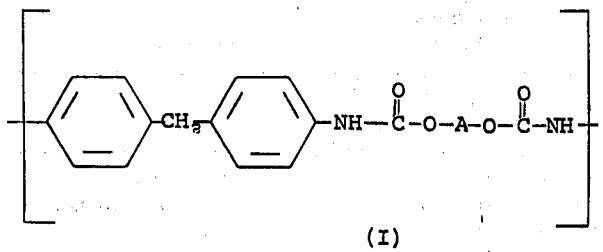

(I)

and

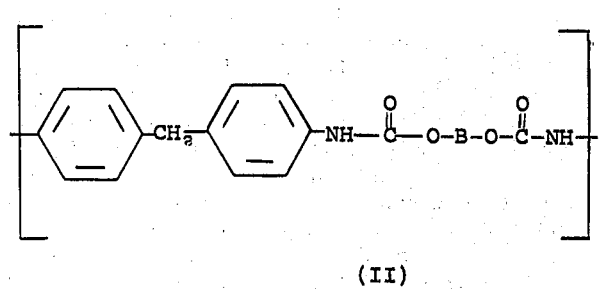

(II)

wherein A is the residue of a poly(1,4-butylene azelate) of the formula HO-A-OH having a molecular weight in the range of 2300 to 3500, B is the residue of an extender diol of the formula HO-B-OH selected from the class consisting of aliphatic diols having from 2 to 6 carbon atoms, inclusive, and the bis(2-hydroxyethylether) of hydroquinone, and wherein the overall proportion of recurring units (I) to recurring units (II) is in the range of about 1:2 to about 1:12.

The elastomers of the invention are useful for all purposes for which elastomeric polyurethanes are conventionally employed but are particularly useful in situations in which the elastomer is to be exposed to temperatures fluctuating from a low of about −20°F to a high of about 200°F. Illustrative of such uses are in fabrication of parts such as radiator hoses, cable jacketing, snowmobile components, and the like.

The term "aliphatic diols having from 2 to 6 carbon atoms, inclusive" means diols of the formula HO—B—OH wherein B is a straight or branched chain alkylene group having the stated carbon atom content. Illustrative of aliphatic diols are ethylene glycol, 1,3-propanediol, 1,4-butanediol, 1,5-pentanediol, 1,6-hexanediol, 1,2-propanediol, 1,3-butanediol, 2,3-butanediol, 1,3-pentanediol, 1,2-hexanediol, 3-methylpentane-1,5-diol, and the like.

The term "poly(1,4-butylene azelate)" means a polyester polyol derived from 1,4-butanediol and azelaic acid having a molecular weight within the range set forth above.

DETAILED DESCRIPTION OF THE INVENTION

The polyurethane elastomers of the invention can be prepared by processes conventional in the art for the synthesis of polyurethane elastomers, the novel features comprising the use of a particular polyester polyol in clearly defined proportions relative to the extender. The processes which can be employed include the one-shot procedure in which all the reactants are brought together simultaneously, and the prepolymer procedure in which the isocyanate is reacted with the polyester diol in a preliminary step and the isocyanate-terminated prepolymer so produced is subsequently reacted with the extender. The one-shot procedure is the preferred method of preparing the elastomeric polyurethanes of the invention. In a most preferred embodiment of the one-shot procedure the polyurethane elastomers of the invention are prepared by a continuous procedure such as that set forth in U.S. Pat. No. 3,642,924.

The poly(1,4-butylene azelates) employed in preparing the polyurethane elastomers are essentially linear polyester diols having a molecular weight from about 2300 to 3500. A particularly preferred group of said polyesters are those having a molecular weight of the order of 3000. Polyester diols having molecular weights in the above ranges have previously been recognized to impart detrimental characteristics when used in the preparation of polyurethane elastomers, as discussed previously. We have demonstrated that the particular group of poly(1,4-butylene azelates) differ from closely related polyester diols in the same molecular weight range by reason of the fact that, when combined in certain proportions with an extender as discussed below, they give rise to elastomers having highly useful properties with marked enhancement of resistance to exposure to low temperatures.

The poly(1,4-butylene azelates) employed in preparing the polyurethane elastomers of the invention are obtained by reaction of azelaic acid with an excess over the stoichiometric proportion of 1,4-butanediol using procedures well-recognized in the art for the preparation of polyester diols.

We have also found that polyester diols having molecular weights in the above range and prepared from 1,4-butanediol and a mixture of azelaic acid and a minor amount (i.e. from about 10% to 50% by weight of the mixture of acids) of dimer acid (see Encyclopedia of Polymer Science and Technology, Vol. 10, 1969, p. 599, Interscience, New York) can be employed in producing the polyurethane elastomers of the invention.

The extenders employed in the preparation of the polyurethane elastomers of the invention are the aliphatic diols, as hereinbefore defined, or the bis(2-hydroxyethylether) of hydroquinone, or mixtures of two or more of these compounds. The proportion of extender to poly(1,4-butylene azelate) employed in the preparation of the polyurethane elastomers of the invention is advantageously within the range of about 2:1 to about 12:1 and preferably is within the range of about 2.5:1 to about 7:1. These proportions of extender to polyester diol will give rise to the corresponding proportions of the recurring unit (II), derived from the extender, and the recurring unit (I), derived from the polyester diol, in the resulting polyurethane elastomers of the invention.

The proportion of extender to polyesterdiol controls the hardness of the elastomer produced in any given instance. In general, the higher the proportion of extender the harder the elastomer. The hardness of the polyurethane elastomers of the invention varies within the range of about Shore D35 to Shore D60 depending upon the proportion of extender to polyesterdiol.

The above proportions of extender to polyesterdiol are significantly lower than proportions employed conventionally in the preparation of polyurethane elastomers.

The proportion of equivalents of 4,4'-methylenebis(-phenyl isocyanate) to the total equivalents of poly(1,4-butylene azelate) and extender employed in making the polyurethane elastomers of the invention is advantageously within the range of about 0.97:1 to 1.07:1 and, preferably, is within the range of 0.99:1 to 1.03:1.

As set forth above, the polyurethane elastomers of the invention are preferably made by the one-shot procedure and most preferably by a continuous one-shot procedure. In such procedures the reactants are brought together in any order. Advantageously, the polyols, i.e. the polyester diol and the extender are preblended and fed to the reaction mixture as a single component, the other major component being the diisocyanate. The mixing of the reactants can be accomplished by any of the procedures and apparatus conventional in the art. Preferably the individual components are rendered substantially free from the presence of extraneous moisture using conventional procedures, for example, by azeotropic distillation using benzene, toluene, and the like, or by heating under reduced pressure at a temperature above the boiling point of water at the pressure employed.

The mixing of the reactants can be carried out at ambient temperature (of the order of 25°C) and the resulting mixture is then heated to a temperature of the order of about 40°C to about 130°C, preferably to a temperature of about 90°C to about 120°C. Alternatively, and preferably, one or more of the reactants is preheated to a temperature within the above ranges before the admixing is carried out. Advantageously, in a batch procedure, the heated reaction components are subjected to degassing in order to remove entrained bubbles of air or other gases before reaction takes place. This degassing is accomplished conveniently by reducing the pressure under which the components are maintained until no further evolution of bubbles occurs. The degassed reaction components are then admixed and transferred to suitable molds or extrusion equipment or the like and cured at a temperature of the order of about 20°C to about 115°C. The time required for curing will vary with the temperature of curing and also with the nature of the particular composition. The time required in any given case can be determined by a process of trial and error.

It is frequently desirable, but not essential, to include a catalyst in the reaction mixture employed to prepare the compositions of the invention. Any of the catalysts conventionally employed in the art to catalyze the reaction of an isocyanate with a reactive hydrogen containing compound can be employed for this purpose; see, for example, Saunders et al., Polyurethanes, Chemistry and Technology, Part I, Interscience, New York, 1963, pages 228–232; see also, Britain et al., J. Applied Polymer Science, 4, 207–211, 1960. Such catalysts include organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese and zirconium, as well as phosphines and tertiary organic amines. Representative organotin catalysts are stannous octoate, stannous oleate, dibutyltin dioctoate, dibutyltin laurate and the like. Representative tertiary organic amine catalysts are triethylamine, triethylenediamine, N,N,N',N'-tetramethylethylenediamine, N,N,N',N'-tetraethylethylenediamine, N-methylmorpholine, N-ethylmorpholine, N,N,N',N'-tetramethylguanidine, N,N,N',N'-tetramethyl-1,3-butanediamine, N,N-dimethylethanolamine, N,N-diethylethanolamine, and the like. The amount of catalyst employed is generally within the range of about 0.02 to about 2.0 percent by weight based on the total weight of the reactants.

When the compositions of the invention are prepared by the less preferred prepolymer method, the diisocyanate and polyester diol are reacted, if desired in the presence of a catalyst as defined above, in a preliminary stage to form an isocyanate-terminated prepolymer. The proportions of diisocyanate and polyester diol employed in the preparation of this prepolymer are consistent with the ranges defined above. The diisocyanate and polyester diol are preferably rendered substantially free from the presence of extraneous moisture, using the methods described above, before the formation of the prepolymer is carried out. The formation of the prepolymer is advantageously carried out at a temperature within the range of about 70°C to about 130°C under an inert atmosphere such as nitrogen gas in accordance with conventional procedures. The prepolymer so formed can then be reacted, at any desired time, with the extender diol to form the desired elastomers of the invention. This reaction is carried out advantageously within the range of reaction temperatures specified above for the one-shot procedure. In general the prepolymer and extender are mixed and heated within the requisite temperature rannge while the mixture is degassed as described previously. The degassed mixture is then transferred to a suitable mold, extrusion apparatus, or the like and cured as described for the one-shot procedure.

If desired, the elastomers of the invention can have incorporated in them, at any appropriate stage of their preparation, additives such as pigments, fillers, lubricants, stabilizers, antioxidants, coloring agents, fire retardants and the like which are commonly used in conjunction with polyurethane elastomers.

The elastomers of the invention can be used for purposes well-known in the art for polyurethane elastomers, for example, as gaskets, diaphragms, tubing, extrusions, and the like. The elastomers of the invention have the advantage of possessing markedly higher resistance to exposure to low temperatures than closely related elastomers which differ but slightly therefrom in chemical composition. This highly useful increase in resistance to exposure to low temperature has been achieved without sacrificing any of the other useful properties such as tensile strength, modulus, and the like.

The following examples describe the manner and process of making and using the invention and set forth the best mode contemplated by the inventors of carrying out the invention but are not to be construed as limiting.

butanediol extender and the resulting mixture was again degassed at 110°C under reduced pressure for 30 minutes. To the resulting product, still at 110°C, was added 0.024 percent (by weight of total reactants) of stannous octoate followed by the 4,4'-methylenebis(phenyl isocyanate). The mixture so obtained was subjected to high speed mechanical stirring for 15 seconds and then poured into a shallow aluminum tray. The poured elastomer and tray were allowed to stand at room temperature (circa 20°C) for 24 hours. Thereafter the elastomer was chopped into pieces, granulated, and dried at 110°C for 3 hours. The dried material was then injection molded to form a sheet (4.5 × 4.5 × 1/16 inch) for test purposes. The resulting sheet was postcured for 16 hours at 115°C followed by 7 days at room temperature (circa 20°C). The cured elastomer was then subjected to physical testing.

In Table I below are recorded the ingredients and proportions thereof (in moles) employed in the preparation of the various elastomers together with the physical properties of the postcured pressed sheets derived from the elastomers.

TABLE I

| Elastomer | A | B | C | D | E | F |
| --- | --- | --- | --- | --- | --- | --- |
| 4,4'-methylenebis-(phenyl isocyanate) | 6.18 | 6.18 | 6.18 | 6.18 | 6.18 | 6.18 |
| 1,4-butanediol | 5 | 5 | 5 | 5 | 5 | 5 |
| Polycaprolactone diol (mw=2000) | 1 | — | — | — | — | — |
| [1]Poly(1,4-butylene azelate) (mw=1950) | — | 1 | — | — | — | — |
| [2]Poly(1,4-butylene azelate) (mw=3075) | — | — | 1 | — | — | — |
| [3]Poly(1,4-butylene/ethylene azelate) (mw=2100) | — | — | — | 1 | — | — |
| [4]Poly(1,6-hexylene adipate) (mw=1935) | — | — | — | — | 1 | — |
| [5]Poly(1,4-butylene/azelate/dimerate) (mw=2340) | — | — | — | — | — | 1 |
| NCO/OH | 1.03 | 1.03 | 1.03 | 1.03 | 1.03 | 1.03 |
| Physical Properties | | | | | | |
| Hardness: Shore A | 95 | 96 | 96 | 94 | 95 | 96 |
| Shore D | 47 | 52 | 51 | 46 | 50 | 48 |
| Density, g/cc. | 1.20 | 1.20 | 1.18 | 1.19 | 1.17 | 1.17 |
| Modulus: psi 50% | 1390 | 1790 | 1830 | 1320 | 1630 | 1420 |
| 100% | 1770 | 2250 | 2150 | 1630 | 2060 | 1860 |
| 200% | | 3440 | 2830 | 2400 | 3190 | 2770 |
| 300% | 4290 | 5100 | 3880 | 3650 | 4530 | 4010 |
| Tensile Strength: psi | 7080 | 6270 | 6590 | 7450 | 5880 | 5540 |
| Elongation at break: % | 450 | 370 | 420 | 490 | 440 | 390 |
| Tensile set: % | 25 | 40 | 70 | 30 | 40 | 60 |
| Compression set: % | 31.8 | 28.1 | 25.6 | 30 | 41.4 | 32.3 |
| Clash-Berg $T_F$, °C | −35 | −39 | −50 | −39 | −39 | −54 |

Footnotes:
| Sample No. | Company |
| --- | --- |
| 1: Polyol 1767-82R | Emery Industries Inc. |
| 2: Polyol 1767-85R | Emery Industries Inc. |
| 3: Polyol 1767-92R | Emery Industries Inc. |
| 4: Polyol 1767-83R | Emery Industries Inc. |
| 5: Polyol 1767-86R (contains approx. 50% W/W dimerate) | Emery Industries Inc. |

EXAMPLE 1

A series of elastomers was prepared from 4,4'-methylenebis(phenyl isocyanate), various polyester diols (some within and some outside the scope of the present invention) and 1,4-butanediol as the extender. The following standard procedure was employed in all cases:

The polyester diol was degassed by heating under reduced pressure at 110°C for 30 minutes. To the resulting material was added with stirring the 1,4-

Elastomers C and F, which are within the scope of the present invention, show markedly greater elasticity at low temperature, as evidenced by the results of the Clash-Berg Test, as compared with Elastomers A, B, D and E but still retain the other highly desirable physical properties of the latter.

I claim:

1. A thermoplastic polyurethane elastomer characterized by the presence therein of each of the recurring units having the formulae:

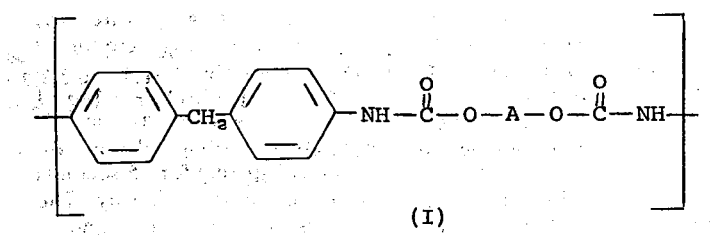

(I)

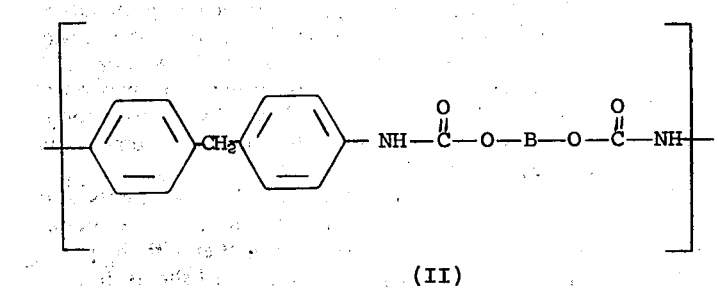

(II)

wherein A is the residue of a poly(1,4-butylene azelate) HO—A—OH having a molecular weight in the range of 2300 to 3500, B is the residue of an extender diol HO—B—OH selected from the class consisting of aliphatic diols having from 2 to 6 carbon atoms inclusive and the bis(2-hydroxyethylether) of hydroquinone, and wherein the overall proportion of recurring units (I) to recurring units (II) is in the range of about 1:2 to about 1:12.

2. A thermoplastic polyurethane elastomer according to claim 1 wherein the poly(1,4-butylene azelate) has a molecular weight of about 3000.

3. A thermoplastic polyurethane elastomer according to claim 1 wherein B is the residue of 1,4-butanediol.

4. A thermoplastic polyurethane elastomer according to claim 1 wherein B is the residue of the bis(2-hydroxyethylether) of hydroquinone.

5. A thermoplastic polyurethane elastomer according to claim 1 wherein the overall proportion of recurring units (I) to recurring units (II) is 1:5.

6. A thermoplastic polyurethane elastomer according to claim 1 wherein the polyester polyol HO—A—OH is derived by reaction of 1,4-butanediol with a mixture of azelaic acid and a minor amount of dimer acid.

7. A thermoplastic polyurethane elastomer according to claim 6 wherein said polyester polyol has a molecular weight of about 2300.

* * * * *